(12) United States Patent
Kurtz et al.

(10) Patent No.: US 6,588,281 B2
(45) Date of Patent: Jul. 8, 2003

(54) DOUBLE STOP STRUCTURE FOR A PRESSURE TRANSDUCER

(75) Inventors: Anthony D. Kurtz, Ridgewood, NJ (US); Alexander A. Ned, Wayne, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 10/057,130

(22) Filed: Oct. 24, 2001

(65) Prior Publication Data

US 2003/0074973 A1 Apr. 24, 2003

(51) Int. Cl.$^7$ .................................................. G01L 9/16
(52) U.S. Cl. ........................................................ 73/754
(58) Field of Search ........................... 73/754, 720, 721, 73/715–719, 727; 338/4, 5; 361/283.1–283.4

(56) References Cited

U.S. PATENT DOCUMENTS

6,272,928 B1 8/2001 Kurtz .......................... 73/721

Primary Examiner—Hezron Williams
Assistant Examiner—Marissa Ferguson
(74) Attorney, Agent, or Firm—Duane Morris LLP (57) ABSTRACT

A stop member is secured to a piezoresistive semiconductor bossed diaphragm at the peripheral area, and includes a first and second slotted apertures in communication with the central active area, the first and second slotted apertures correspond in location with opposing sides of a central boss. The stop member includes a stop cavity located between the first slotted aperture and the second slotted aperture, and the stop cavity overlies the central boss and is separated therefrom to enable the diaphragm to deflect when a force is applied and to enable the central boss to impinge on the surface of the stop cavity when an excessive force is applied. The first and second slotted apertures permit another force to be applied to the active region of the diaphragm in a direction opposite to the stopped direction. A second stop member is secured to the diaphragm to provide stopping in either direction.

16 Claims, 6 Drawing Sheets

DOUBLE STOP STRUCTURE FOR A PRESSURE TRANSDUCER

BACKGROUND OF THE INVENTION

1. Field of Invention

The present invention relates generally to semiconductor transducers, and more particularly to differential pressure transducers suitable for measuring differential pressure that employ piezoresistive sensors on a bossed diaphragm and stop members for limiting the deflection of the diaphragm upon the application of excessive force, and methods of making the same.

2. Description of Related Background Art

Semiconductor pressure transducers are employed in the measurement of pressure in numerous types of applications. Many pressure transducers employ a relatively thin diaphragm or deflecting member fabricated from semiconductor material such as silicon. The diaphragm is the thin portion of the transducer, which determines the pressure range of the device, which varies depending upon the thickness of the diaphragm. Typically upon the diaphragm is deposited or diffused a piezoresistive strain gage configuration, such as a bridge circuit, whereby the resistors associated with the bridge exhibit a change in resistance according to a deflection in the diaphragm as is well known. By monitoring the change in resistance, one obtains an output voltage indicative of the applied pressure or force.

One particular type of pressure transducer is a differential pressure transducer. Differential pressure transducers provide an output which is the difference between two pressures. For example, when a pressure $P_1$ is applied to one face of the deflecting member and a pressure $P_2$ is applied to the other face of the deflecting member, the resulting deflection will be determined by the difference in pressure, i.e., $P_1-P_2$. An example of differential piezoresistive bridge pressure transducers is illustrated in U.S. Pat. No. 6,272,928, entitled "Hermetically Sealed Absolute and Differential Pressure Transducer," assigned to the assignee herein.

Frequently, differential pressure transducers are subjected to a high "line" pressure. This high "line" pressure refers to the pressure which both sides of the sensor are subjected to while simultaneously measuring the difference in pressure from one side of the sensor to the other. Often the differential pressure is much smaller than the "line" pressure. In many instances, however, due to blockage in the line, the full "line" pressure applied to either side of the sensor separately thereby creates an enormous pressure difference across the sensor. In these instances, the deflection of the sensor in either direction must be restrained to avoid excessive strain on the diaphragm which causes it to fracture.

One known method of limiting the deflection of the sensor is to attach a deflection limiting member with a shallow cavity to the sensor, commonly referred to as a "stop." The cavity depth is fixed to limit the deflection of the sensor a predetermined distance to thereby avoid excessive strain of the sensor. When a stop disposed on a sensor structure has no aperture to permit the passage of gas or air, the stop will only permit deflection until the sensor contacts the bottom of the cavity of the stop. In measuring an absolute pressure (unidirectional), it is apparent that this type of structure will limit the deflection of the sensor to insure that above a certain pressure, the sensor cannot deflect, thus preventing excessive strain on the sensor.

For bi-directional sensors, a stop without an aperture cannot be used. For the sensor to respond to pressure from either direction, the stops require apertures to allow the applied pressure to reach the deflecting sensor structure thereby causing it to deflect. Prior to the present invention, apertures have been located in the central portion of stop structures. To ensure adequate pressure application to the sensor, the central aperture in the stops should be as large as possible. To ensure the best stopping, however, the apertures in the stop should be as small as possible. When the apertures are disposed in the central portion of the stop structure, the region of the sensor where the most extensive deflection occurs does not entirely contact the bottom of the cavity of the stop where the aperture is located. Clearly, there are problems associated with stops having a central aperture, which the present invention seeks to avoid.

There still remains a need for a stop structure that provides improved stopping capabilities, while ensuring adequate pressure application to the sensor structure. There also remains a need for a stop structure that provides apertures that are large enough to insure adequate pressure application, while providing apertures that are small enough to insure the best "stopping." There also remains a need for a semiconductor sensor that measures differential pressure across the sensor while being capable of withstanding high unidirectional pressure across the sensor.

SUMMARY OF THE INVENTION

Briefly described, a preferred embodiment of the present invention provides a semiconductor sensor for measuring differential pressure across the sensor diaphragm and operable in the presence of an excess unidirectional force applied to the sensor from either direction to stop said sensor diaphragm from further deflection during the presence of said excess force which tends to fracture said diaphragm. The transducer sensor includes a planar semiconductor diaphragm including a central active area on a top surface surrounded by a groove of a given width and depth which forms a central boss, the central area within the groove capable of deflection, and a peripheral non-active area surrounding the groove. The diaphragm has a relatively smooth bottom surface upon which piezoresistive sensors are formed that correspond in location on the bottom surface with the groove on opposing sides of the central boss of the top surface. A stop member is secured to the diaphragm at the peripheral area, and includes a first slotted aperture and a second slotted aperture in communication with the active area, the first and second slotted apertures extending generally along the length of the active area and which correspond in location with opposing sides of the central boss. The stop member includes a stop cavity located between the first and second slotted aperture, and the stop cavity overlies the central boss and is separated therefrom to enable the diaphragm to deflect when a force is applied and to enable the central boss to impinge on the surface of the stop cavity when an excessive force is applied. The first and second slotted apertures permit another force to be applied to the active region of the diaphragm in a direction opposite to the stopped direction.

In an alternate preferred embodiment of the invention, a stop member for a differential semiconductor sensor employing a bossed diaphragm includes a planar member having a first and a second slotted aperture, the first the second slotted apertures being substantially parallel and extending through the planar member. The first and the second slotted apertures are positioned so that when the stop member is disposed on a bossed diaphragm the first and the second slotted apertures are located along the outer edge of the active region of the diaphragm, and the slotted apertures are relatively as long as the active region. The stop member includes a stop cavity located between the slotted apertures, to allow a central boss of the diaphragm to impinge upon the surface of the stop cavity when an excessive force is applied to the diaphragm.

In an alternative preferred embodiment, the invention includes a double stop structure for a semiconductor pressure transducer employing a bossed diaphragm, including a first stop member that includes a plurality of cutout portions on the periphery thereof for accessing peripheral contact areas of a bossed diaphragm of a pressure transducer; a first cavity in a central portion of the first stop member for receiving the diaphragm of a pressure transducer; and two slotted apertures adjacent the first cavity and extending through the first stop member permitting access to the environment, and a second stop member including: a second cavity formed in a central portion of the second stop member for receiving the diaphragm, and two slotted apertures adjacent the second cavity and extending through said second stop member permitting access to the environment. The first stop and second stop member are operable under excessive force to prevent the diaphragm from excessive strain leading to fracture.

The present invention also provides a preferred method for manufacturing a differential pressure transducer that includes the steps of fabricating a bossed diaphragm including a first substrate composed of silicon, and a second substrate composed of silicon dioxide, the diaphragm including an central active region, and a peripheral non-active region separated by a groove which defines a central boss capable of deflecting, disposing a plurality of piezoresistive sensing elements on the active region, forming a plurality of contact areas on the diaphragm that extend from the sensing elements to the peripheral region, forming a first stop member including a cavity in the central portion thereof, a plurality of cutout portions of the periphery thereof, and two slotted apertures extending through the first stop member, and forming a second stop member including a cavity in the central portion thereof and two substantially parallel slotted apertures extending through the second stop member.

DETAILED DESCRIPTION OF THE INVENTION

Figure 1:
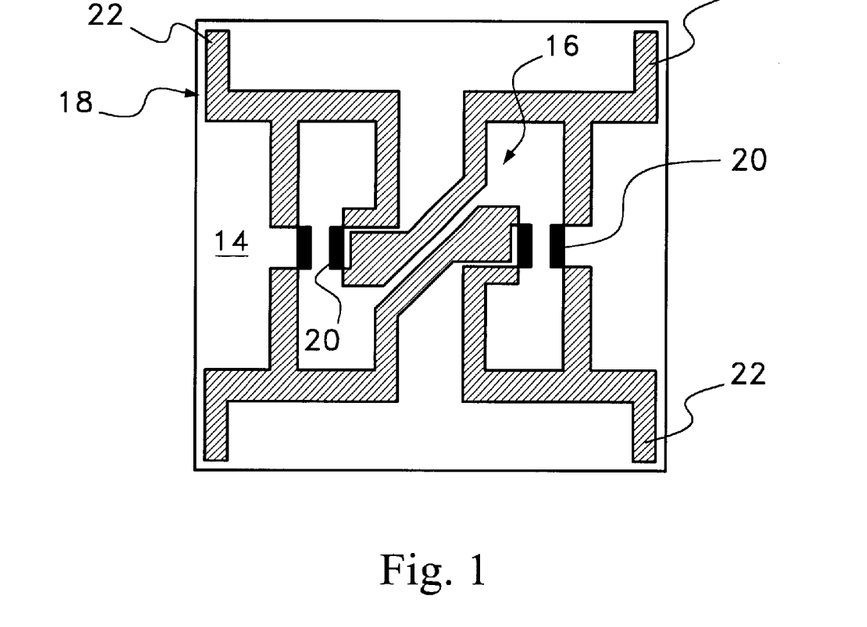
FIG. 1 is a top plan view of the diaphragm of the transducer of the present invention.

Referring now to the Figures, it is to be understood that like numbers identify like elements of the invention. Referring to FIG. 1, there is shown a top plan view of a diaphragm 10 of the transducer sensor according to a preferred embodiment of the present invention. The diaphragm 10 with a "bossed" central area is constructed in accordance with the disclosure of U.S. Pat. No. 4,236,137 which is commonly assigned to the assignee herein, the entire disclosure of which is hereby incorporated by reference. The bossed diaphragm disclosed in U.S. Pat. No. 4,236,137 is particularly well suited for the preferred embodiment of the present invention. The sensor includes a sensing diaphragm and a picture frame type of clamping region. The diaphragm has a thin part, the thickness of which controls the pressure range of the device. The boss is a thicker region located in the middle of the diaphragm.

As illustrated in FIG. 1, the diaphragm 10 is rectangular or square in configuration. Piezoresistive sensors 20 are disposed on the diaphragm 10 in the central area 16 of the diaphragm on a relatively smooth bottom surface 14, typically by diffusion or deposition. Contact areas 22 extend from the piezoresistive sensors 20 to the peripheral area 18 of the diaphragm 10. The piezoresistive sensors may be configured as a Wheatstone bridge circuit.

Figure 2:
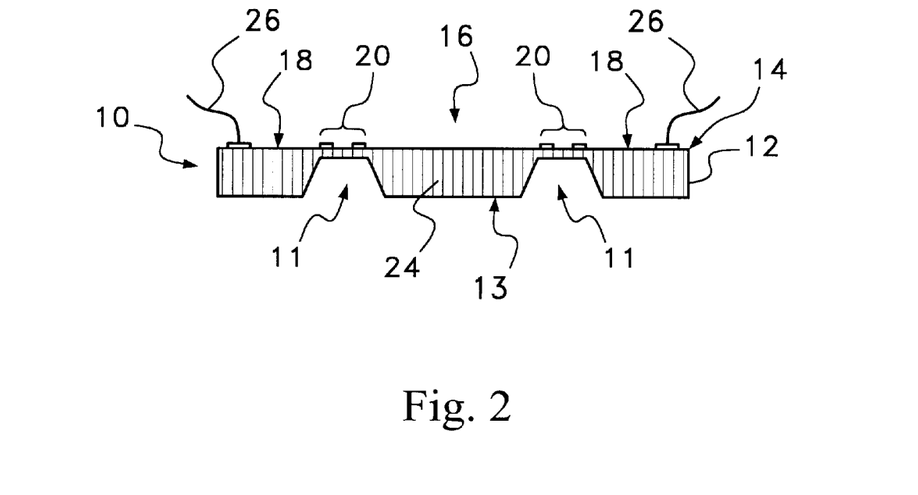
FIG. 2 is a cross sectional side view of the diaphragm of FIG. 1.

Referring to FIG. 2, the cross sectional side view of the diaphragm 10 of FIG. 1 illustrates a first substrate 12 composed of silicon, and a second substrate 14 composed of silicon dioxide. There is also a groove 11 formed by an etching process with a selected width and depth which surrounds a central active area of the diaphragm 10, which forms a central boss 24 on the top surface 13 of the diaphragm 10. The thickness of the diaphragm 10 controls the pressure range of the sensor device, and the central boss 24 serves to stiffen the diaphragm 10 to improve performance and linearize the mechanical response of the sensor. For a typical piezoresistive sensor diaphragm having a deflecting portion of 0.06"×0.060" to about 0.03"×0.03", the deflection required to obtain sufficient stress in the sensor to obtain the proper piezoresistive output from the sensor is approximately 0.0001", while the deflection of the sensor sufficient to cause excessive strain, which leads to fracture, is approximately 0.0003". For the "clamped edge" sensor particularly suited for the present invention and described in U.S. Pat. No. 4,236,137, the maximum deflection occurs at the center of the deflecting member or bossed diaphragm. The clamped edge allows the transducer to be clamped or mounted to a housing at the surface thereof.

Still referring to FIG. 2, the peripheral area 18 surrounding the groove 11 and external to the active area 16 is also referred to as a non-active area, and serves as a "picture frame" type of clamping region. As illustrated in FIGS. 1 and 2, the contact areas 20 extend to the non-active or peripheral area 18. Leads 26 are disposed at the distal ends of the contact areas 20. Leads are added at any convenient stage in the manufacturing process. Leads are located on the inactive or peripheral area 18 of the diaphragm 10 and being isolated do not affect the overall response of the diaphragm 10. As further illustrated in FIG. 2, piezoresistive sensors 20 are disposed in the active area 16 of the diaphragm 10 on the bottom surface 14 in a location that corresponds to the location of the groove 11 on the top surface 13, and are disposed on either side of the groove 11 on opposing sides of the central boss 24.

Figure 3:
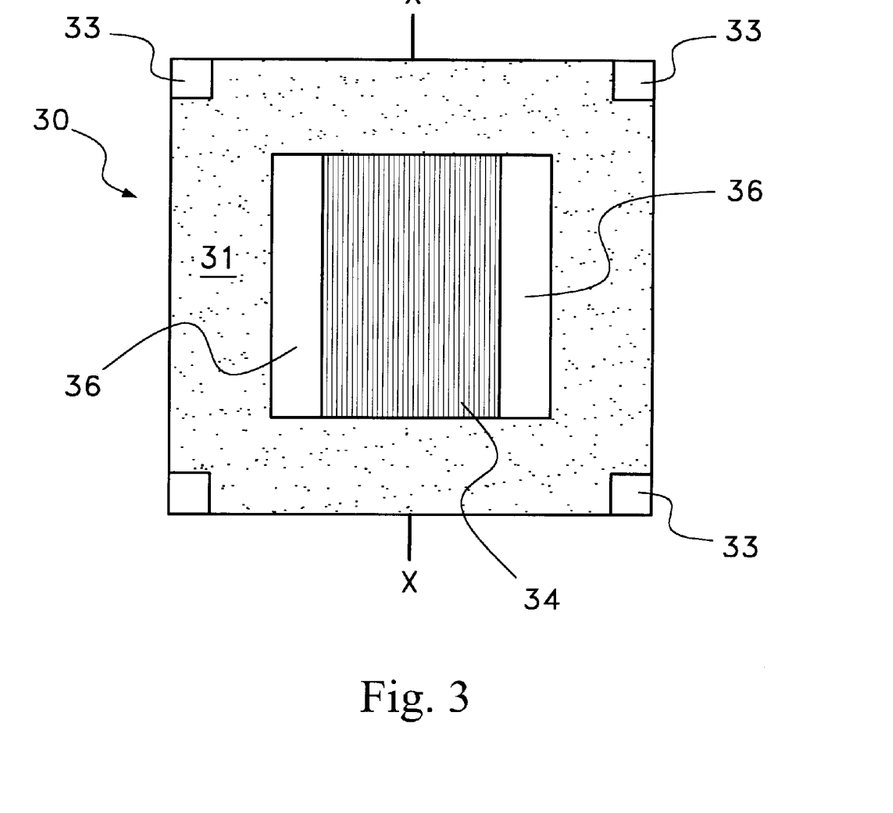
FIG. 3 is a top plan view of a first stop member according to a preferred embodiment of the present invention.

Referring now to FIG. 3, there is illustrated a top plan view of a first stop member 30 according to a preferred embodiment of the present invention. The stop member is preferably fabricated from glass or an insulator. The periphery of the inner surface 31 of the first stop member 30 is secured to the diaphragm 10 at the peripheral area 18. A pair of slotted apertures 36 are formed in the first stop member 30 which communicate pressure media to the active area 16 of the diaphragm 10. The slotted apertures 36 extend generally along the length of the active area 16 but are sufficiently narrow to allow the boss 24 to impinge on the bottom of the cavity 34 in the stop 30. When the first stop member 30 is disposed on the diaphragm 10, the location of the slotted apertures 36 coincides with the location of the groove 11 on opposing sides of the central boss 24.

Slotted apertures 36 are substantially parallel to each other, and are approximately equidistant from central axis X of the stop member 30. The slotted apertures 36 are rectangular in configuration, and extend through the stop member 30 from an inner surface 31 to an outer surface 32 of the stop member 30. Although slotted apertures 36 are illustrated as having a rectangular configuration, other suitable geometric shapes may be used provided that the apertures are large enough to permit applied pressure to the diaphragm but small enough to insure a good stopping surface. For a typical sensor structure with a deflecting area of 0.06×0.06 inches, a preferred slot width is 0.01 inch and preferred length is 0.06 inch, while the dimensions of the boss 24 are 0.04×0.04 inches.

Disposed between the slotted apertures 36 is a stop cavity 34, which is formed by an etching process. The stop cavity 34 overlies and is separated from the central boss 24 to enable the diaphragm 10 to deflect when a force is applied to the sensor. The stop cavity 34 also is enables the diaphragm 10 to impinge upon the surface of the stop cavity 34 when excessive force is applied, i.e., a pressure above the selected pressure range of the device, to avoid fracture to the thin diaphragm 10. The first stop member 30 also includes a plurality of cutout portions 33 as indicated by the dashed lines in FIG. 3. The cutout portions 33 permit access to the contact areas 22 and to any leads 26 disposed thereon.

Figure 4:
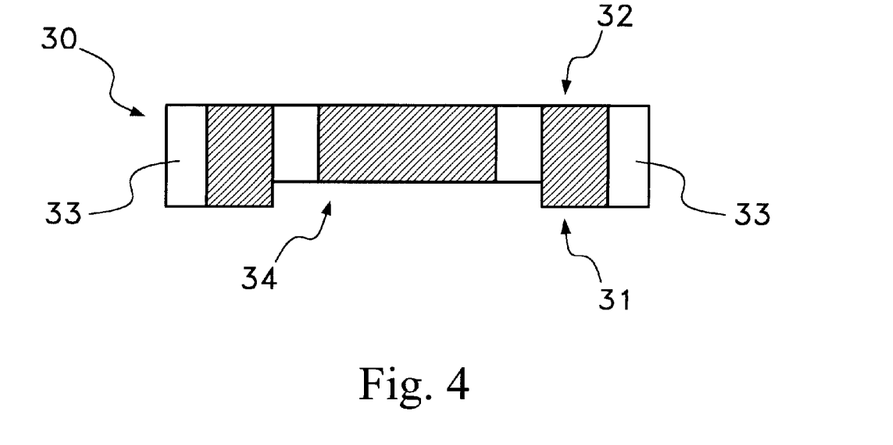
FIG. 4 is a cross sectional side view of the first stop member of FIG. 3.

Referring to FIG. 4, which illustrates a cross sectional side view of the first stop member of FIG. 3, the stop cavity 34, cutout portions 33 and the slotted apertures 36 are further illustrated. A preferred cavity depth is approximately 0.0002 to 0.0003 inches and width is 0.04 inches. In this preferred embodiment, two 0.01×0.06 inch slotted apertures, and a cavity depth of 0.0002 to 0.0003 inches, the boss 24 can impinge on the bottom of the cavity 34 when high pressures are applied.

Figure 5:
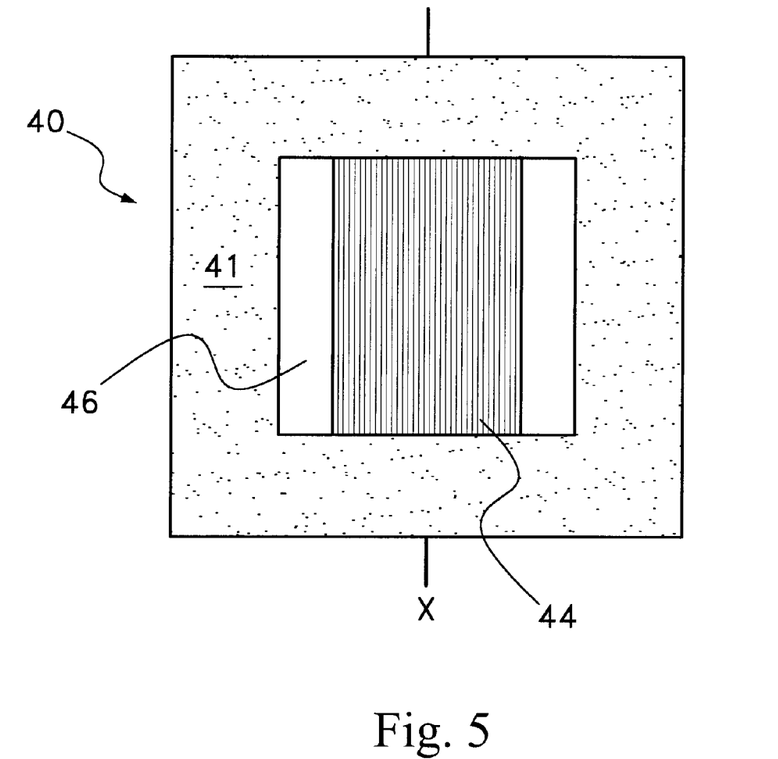
FIG. 5 is a top plan view of a second stop member according to a preferred embodiment of the present invention.
Figure 6:
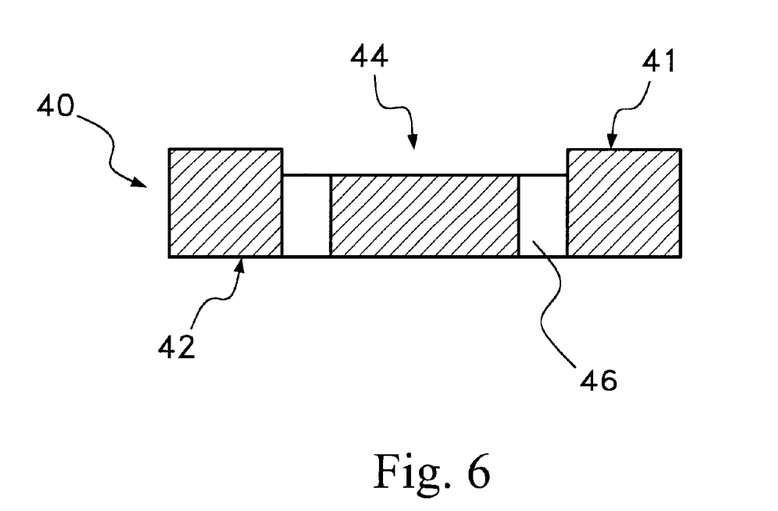
FIG. 6 is a cross sectional side view of the second stop member of FIG. 5.

Referring to FIGS. 5 and 6, a second stop member 40 is illustrated. As can be seen, the second stop member 40 is similar in configuration to the first stop member 30. As with the first stop member 30, the second stop member 40 includes two slotted apertures 46 which communicate with the active area 16 of the diaphragm 10. The slotted apertures 46 extend through the second stop member 40 from an inner surface 41 to an outer surface 42 of the stop member 40, and are substantially parallel to each other, and are approximately equidistant from central axis X of the stop member 30. The stop cavity 44 formed by an etching process is located between the slotted apertures 46, and is approximately 0.0002 to 0.0003 inches in depth. The periphery of the inner surface 41 of the second stop member 40 is attached to the peripheral region 18 of the diaphragm 10.

Referring to FIG. 6, the stop cavity 44 and the slots 46 are further illustrated in a cross sectional view. The first and second stop members 30 and 40 are composed of a non-conductive borosilicate glass with a low coefficient of expansion, commonly known as Pyrex. The slotted apertures 36 and 46 illustrated in FIGS. 3 to 6 are substantially rectangular in configuration, but other suitable geometric shapes may be used, provided the apertures are large enough to permit proper passage of pressure media, but narrow enough to permit the entire bottom surface of the boss 24 to touch the bottom of the cavity.

Figure 7:
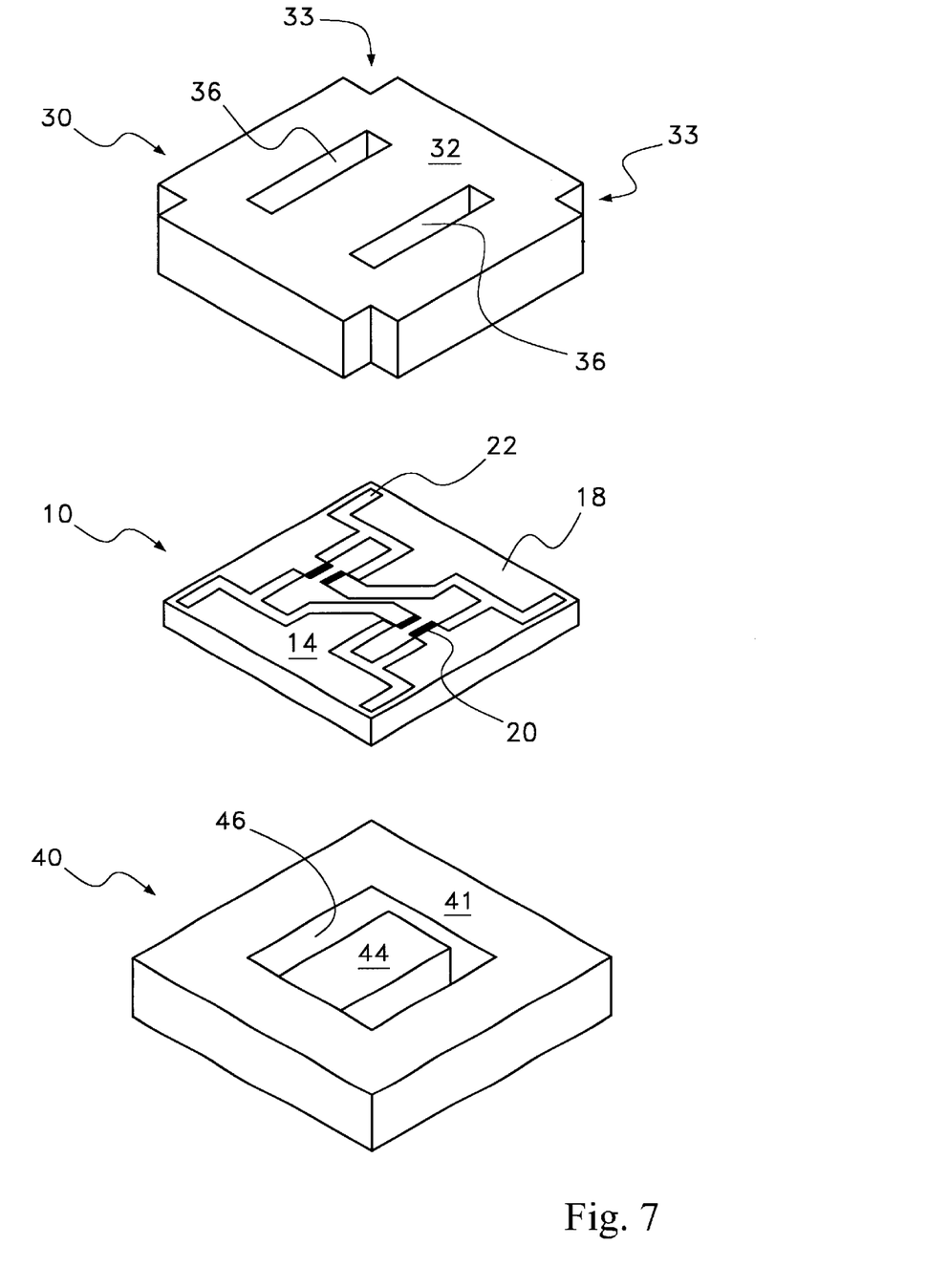
FIG. 7 is an exploded view of the transducer of the present invention.

Referring to FIG. 7, an exploded view of the transducer semiconductor sensor including first and second stop members 30 and 40 is illustrated. As can be seen, the slotted apertures 36 of the first stop member 30 are open to the environment and visible on the outer surface 32. The inner surface 31 of the first stop member 30 is electrostatically bonded on the surface 14 of diaphragm 10 at the peripheral area 18, and the cutout portions 33 provide access to the contact areas 22. The inner surface 41 of a second stop member 40 is electrostatically bonded on an opposite surface 13 of the diaphragm 10 at the peripheral area 18 when stopping is desired in either direction.

Figure 8:
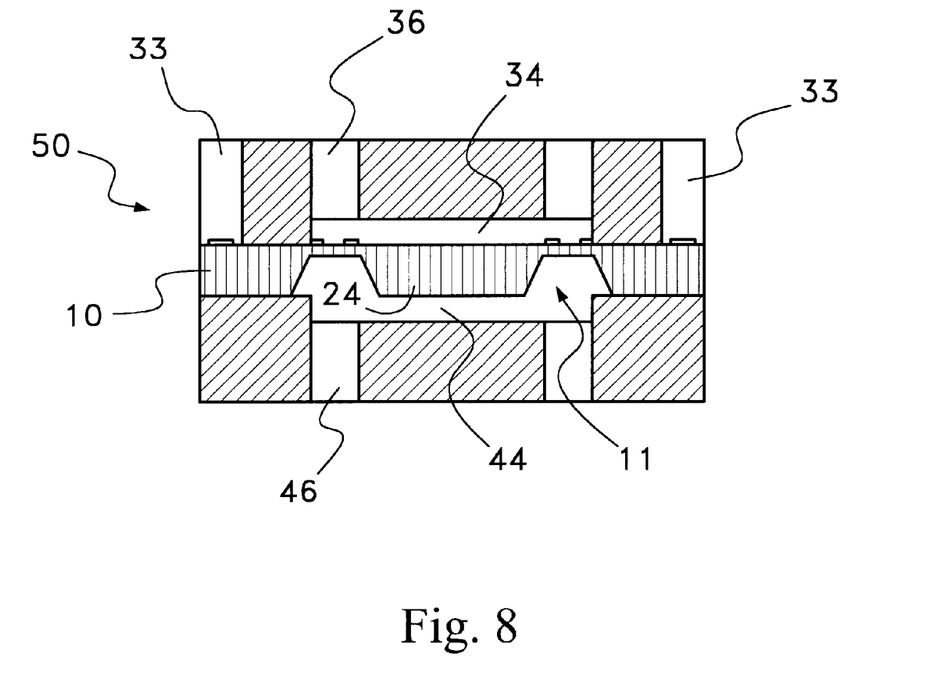
FIG. 8 is a cross sectional side view of the transducer according to a preferred embodiment of the present invention.

Referring to FIG. 8, a cross sectional side view of the transducer of FIG. 7 illustrates a preferred embodiment of the present invention as a composite structure. As can be seen, slotted apertures 46 are provided for supplying pressure media to the diaphragm 10. Shallow cavity 44 serves to communicate the pressure received to the active area 16 of the diaphragm. Likewise, slotted apertures 36 permit pressure media into the cavity 34, which in turn serves to communicate a pressure received to the diaphragm 10. The applied pressure or pressures serve to deflect the sensor (the deflection being caused by differences of oppositely applied pressures indicates the differential pressure) and a signal indicative of the differential pressure can be supplied using the sensor and an electrical connection to the contact areas. The cavity 44 of stop member 40 also limits the deflection of the sensor as it is shallow enough to permit the boss 24 to impinge upon the surface thereof when an applied force is excessively high.

Figure 9:
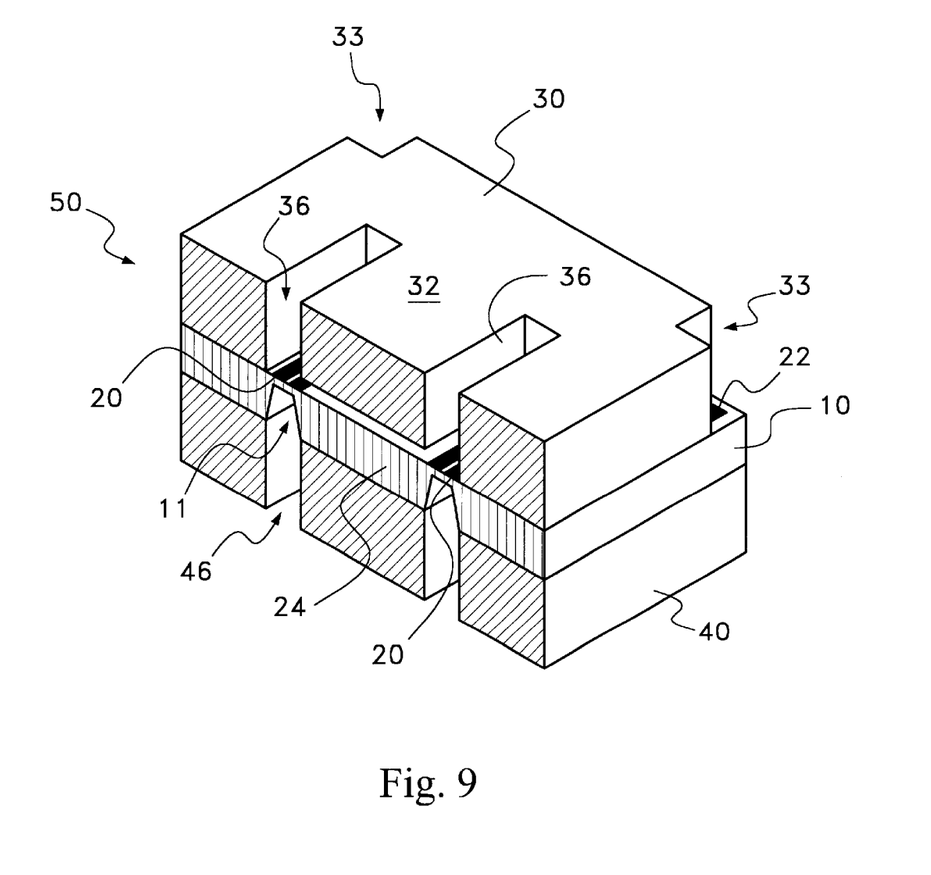
FIG. 9 is an isometric view of the sensor of FIGS. 7 and 8.

Referring to FIG. 9, an isometric view of the invention further illustrates the transducer 50 of the present invention with a double stop structure disposed thereon. In FIG. 9, the piezoresistive sensors 20 are located within the active region 16 of the diaphragm 10 on the bottom surface 14. The location of the sensors 20 correspond to the location of the groove 11 on the top surface 13 of the diaphragm 10, and, as also illustrated in FIG. 2, are disposed on either side of the groove 11 on opposing sides of the central boss 24. The location of the slotted apertures are also seen in FIG. 9 as bording the piezoresistive sensors 20. The slotted apertures 36 and 46, the piezoresistive sensors 20, and the groove 11 coincide in spatial placement in a given direction.

The transducer 50 in operation will now be described. When pressure is applied to the sensor through the slotted apertures 36, the bossed diaphragm 10 begins to deflect and the piezoresistive sensors 20 convert the mechanical signal into electrical output. When high pressures are applied, the entire bottom surface of the central boss 24 can rest upon the bottom of the cavity 34 while the slotted apertures 36 continue to admit the pressure media through the slotted apertures 36. This permits another force to the active region in a direction opposite to the stopped direction. When stopping in both directions is desired, a second stop structure 40 with similar slotted apertures 46 is affixed to the side of the sensor that does not have a piezoresistive sensor network.

Thus, the diaphragm 10 is provided with a double "stop" in either direction, while still allowing pressure media to reach both sides of the sensor diaphragm 10. For example, if the thickness of the diaphragm is capable of withstanding and measuring a pressure of 4 psi as a maximum limit, and due to unidirectional or high "line" pressure or blockage in one of the pressure lines causing a spike of more than 4 psi, the pressure received by the diaphragm is above the limit of 4 psi, the diaphragm can withstand the spike or overpressure, since cavities 34 and 44 provides a "stop" surface which limits the further deflection of the diaphragm, and possible fracture. In the preferred embodiment shown and described, the cavity 44 is shallow enough to provide a surface upon which the central boss 24 impinges.

In addition to the foregoing advantages, the placement of the slotted apertures 34 and 44 equidistant from the center of the stop member 30 and 40 and the selected dimensions of the cavities provides a surface upon which the diaphragm impinges, as opposed to having a cover or stop member with a central aperture, in which the diaphragm would not completely impinge upon the surface in the area of the aperture where the diaphragm has the greatest amount of deflection.

Although the invention has been described and illustrated in the preferred form with a certain degree of particularity, it is understood that the present disclosure of the preferred form has been made only by way of example, and that numerous changes in the details of construction and combination and arrangement of parts may be made without departing from the spirit and scope of the invention as claimed herein. It is intended that the invention shall cover, by suitable expression in the appended claims, whatever features of patentable novelty exist in the invention disclosed.

What is claimed is:

1. A semiconductor sensor for measuring differential pressure across the sensor diaphragm and operable in the presence of an excess unidirectional force applied to the sensor from either direction to stop said sensor diaphragm from further deflection during the presence of said excess force which tends to fracture said diaphragm, comprising:
    a planar semiconductor diaphragm comprising:
        a central active area on a top surface surrounded by a groove of a given width and depth which forms a central boss on said top surface and a bottom surface opposite said bossed surface, said central area within said groove capable of deflection; and
        a peripheral non-active area surrounding said groove; and
        a relatively smooth bottom surface;
    piezoresistive sensors formed on said bottom surface of said diaphragm that correspond in location on said bottom surface with said groove on opposing sides of said central boss of said top surface;
    a first stop member secured to said diaphragm at said peripheral area on said top surface, said stop member comprising:
        a first slotted aperture and a second slotted aperture in communication with said active area, said first slotted aperture and said second slotted aperture extending generally along the length of said active area and which correspond in location with opposing sides of said central boss;
        a stop cavity located between said first slotted aperture and said second slotted aperture, said stop cavity overlying said central boss and separated therefrom to enable said diaphragm to deflect when a force is applied and to enable said central boss to impinge on the surface of said stop cavity when an excessive force is applied, said first and second slotted apertures permitting another force to be applied to said active region of said diaphragm in a direction opposite to said stopped direction; and
    a second stop member secured to said diaphragm on said bottom surface, wherein said second stop member comprises:
        a first slotted aperture and a second slotted aperture in communication with said active area, said first slotted aperture and said second slotted aperture extending generally along the length of said active area and which correspond in location with opposing sides of said central boss on said top surface;
        a stop cavity located between said first slotted aperture and said second slotted aperture, said stop cavity overlying said central boss on said top surface and separated from said bottom surface of the active area to enable said diaphragm to deflect when a force is applied and to enable said bottom surface to impinge on the surface of said stop cavity when an excessive force is applied, said first and second slotted apertures permitting another force to be applied to said active region of said diaphragm in a direction opposite to said stopped direction.

2. The sensor according to claim 1, said diaphragm further comprising contact areas extending from said sensors to said peripheral area of said diaphragm.

3. The sensor according to claim 2, wherein at least one of said first and second stop members include a plurality of cutout portions on the periphery thereof for accessing said contact areas.

4. The sensor according to claim 3, wherein said diaphragm is formed of silicon.

5. The sensor according to claim 4, wherein said piezoresistive sensors are Wheatstone bridge circuits.

6. The sensor according to claim 5, wherein said stop members are composed of borosilicate glass.

7. The sensor according to claim 6, wherein said first slot and said second slot are substantially parallel and approximately equidistant from a central axis of said diaphragm.

8. The sensor according to claim 1 wherein said stop members are fabricated from an insulator.

9. A stop member for a differential semiconductor sensor employing a bossed diaphragm, comprising:
    a planar member having a first slotted aperture and a second slotted aperture, said first and said second slotted apertures substantially parallel and extending through said planar member, said first and said second slotted apertures positioned so that when said stop member is disposed on a bossed diaphragm said first and said second slotted apertures are located along the outer edge of the active region of the diaphragm, said slotted apertures being relatively as long as the active region; and
    a stop cavity located between said first slotted aperture and said second slotted aperture, to allow a central boss of said diaphragm to impinge upon the surface of said stop cavity when an excessive force is applied to said diaphragm.

10. The stop member according to claim 9, wherein said planar member is composed of borosilicate glass.

11. The stop member according to claim 10, wherein said stop member further comprises a plurality of cutout portions on the periphery of said planar member for accessing contact areas on said bossed diaphragm.

12. The stop member according to claim 11, wherein said first slot and said second slotted apertures are approximately equidistant from a central axis of said stop member.

13. A double stop structure for a semiconductor pressure transducer employing a bossed diaphragm, comprising:
    a first stop member including: a plurality of cutout portions on the periphery thereof for accessing peripheral contact areas of a bossed diaphragm of a pressure transducer; a first cavity in a central portion of said first stop member for receiving said diaphragm of a pressure transducer; and two slotted apertures adjacent said first cavity and extending through said first stop member permitting access to the environment for receiving a pressure; and a second stop member including: a second cavity formed in a central portion of said second stop member for receiving said diaphragm; and two slotted apertures adjacent said second cavity and extending through said second stop member permitting access to the environment for receiving a pressure, said first stop and said second stop member operable under excessive force to prevent said diaphragm from fracturing.

14. The structure of claim 13, wherein said first and said second stop members are composed of borosilicate glass.

15. The structure of claim 14, wherein said slotted apertures of said first and said second stop members are substantially parallel to each other.

16. The structure according to claim 14, wherein said slotted apertures of said first and said second stop members coincide with each other, and are approximately equidistant from a central axis of said first and second stop members.

* * * * *